N. SCHENK.
RESILIENT WHEEL.
APPLICATION FILED SEPT. 12, 1910.
1,019,847.
Patented Mar. 12, 1912.
2 SHEETS—SHEET 2.
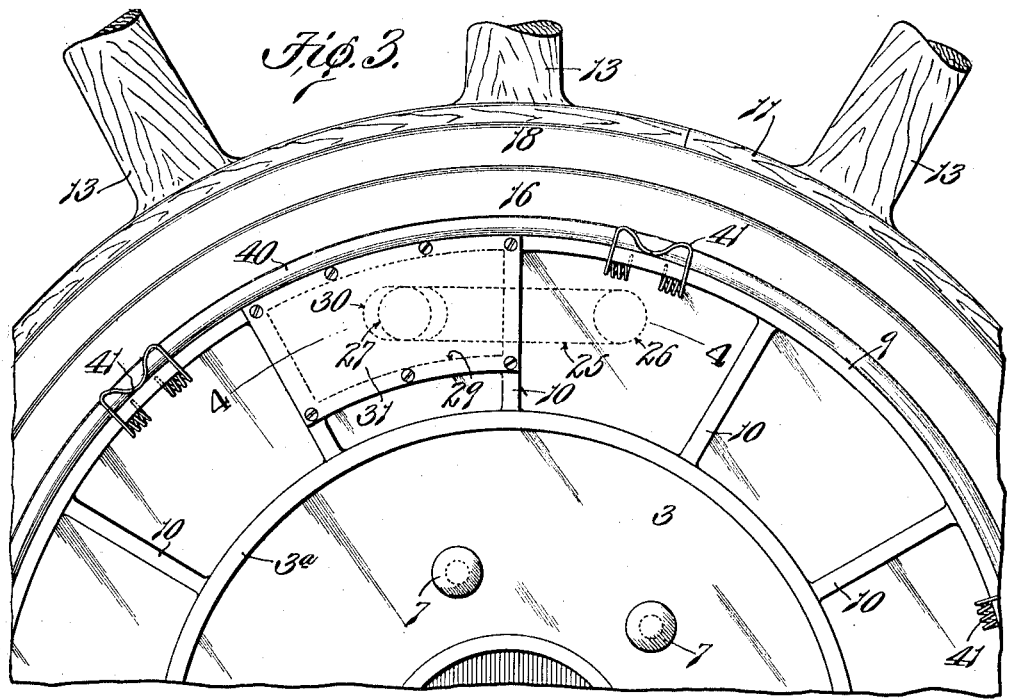
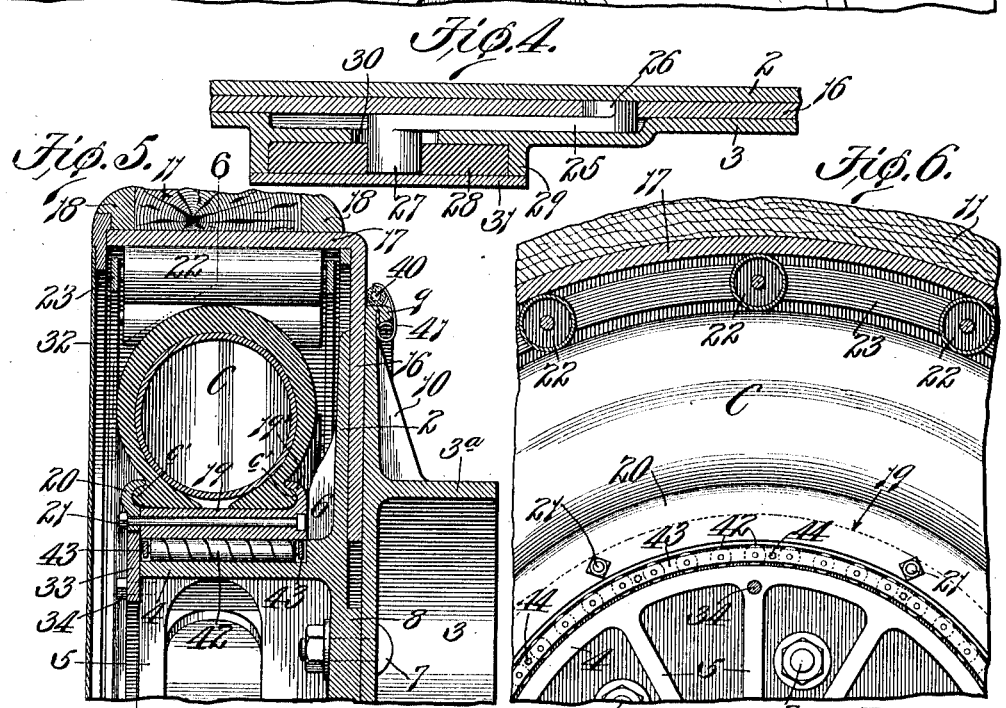
Witnesses:
Geo. P. Ladson
Wells L. Church
Inventor,
Nicholas Schenk.
By Paul Bakewell, Atty.

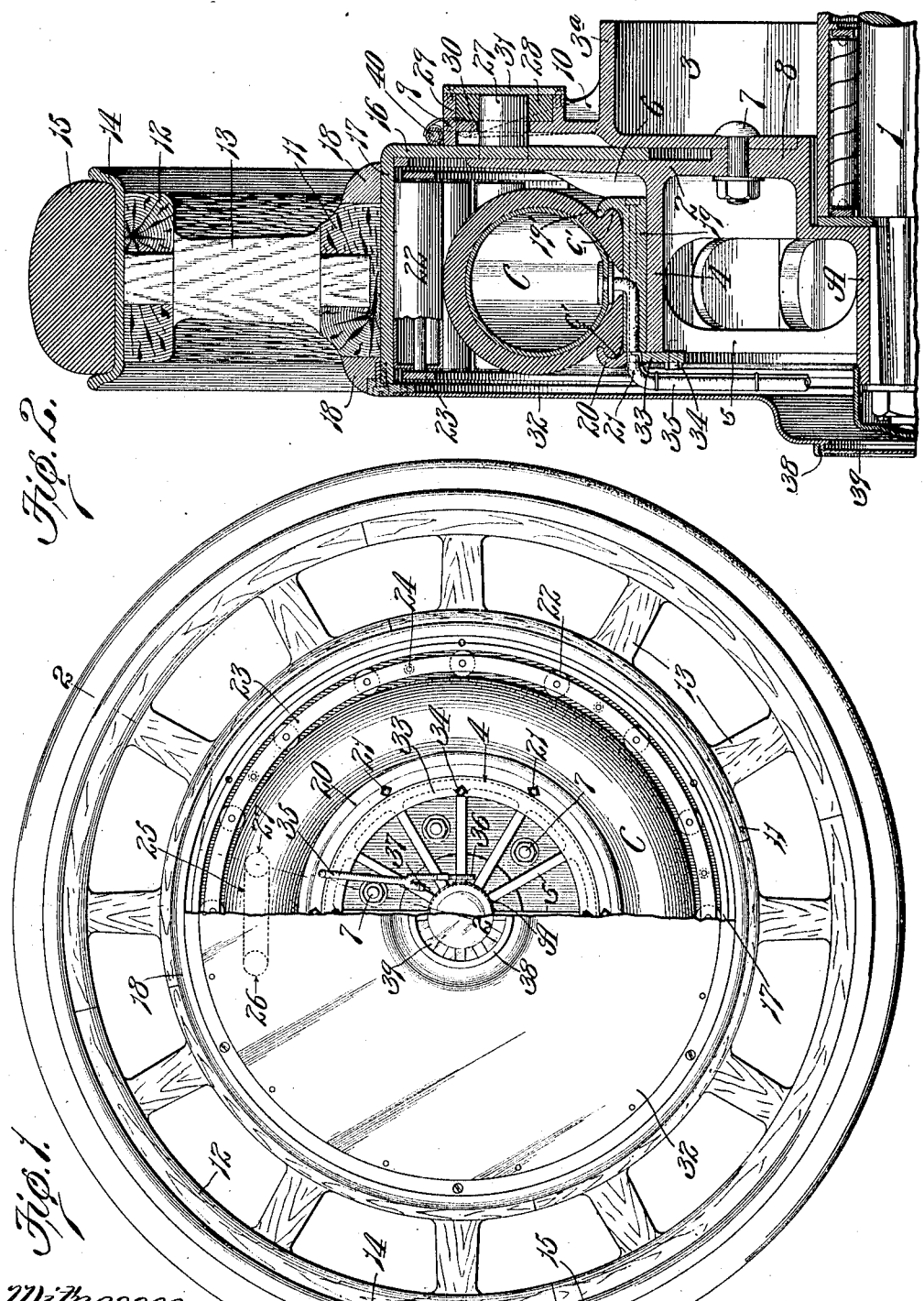

UNITED STATES PATENT OFFICE.

NICHOLAS SCHENK, OF ST. LOUIS, MISSOURI.

RESILIENT WHEEL.

1,019,847. Specification of Letters Patent. Patented Mar. 12, 1912.

Application filed September 12, 1910. Serial No. 581,629.

*To all whom it may concern:*

Be it known that I, NICHOLAS SCHENK, a citizen of the United States, residing at St. Louis, Missouri, have invented a certain new and useful Improvement in Resilient Wheels, of which the following is a full, clear, and exact description, such as will enable others skilled in the art to which it appertains to make and use the same.

This invention relates to resilient wheels of that type which is provided with a cushion arranged between a hub section and a rim section that can move relatively to each other in a vertical plane.

The main object of my present invention is to provide a wheel of the type referred to which is so designed that the cushion can move circumferentially relatively to the hub section and the rim section and thus reduce the friction on the cushion.

Another object is to provide a wheel of the type referred to which is comparatively narrow or not much wider than an ordinary automobile wheel.

Another object is to provide a wheel of the type referred to which is so designed that the cushion and the rollers on which it travels can be removed easily. And still another object is to provide a resilient wheel which is light, strong and of neat and ornamental appearance.

Figure 1 of the drawings is a side elevational view of a wheel constructed in accordance with my invention, a portion of the removable side plate of the rim section being broken away to more clearly illustrate the construction of the hub section; Fig. 2 is an enlarged cross sectional view taken on approximately the line 2—2 of Fig. 1; Fig. 3 is an enlarged elevational view of a portion of the inner side of the wheel; Fig. 4 is a detail sectional view taken on approximately the line 4—4 of Fig. 3; Fig. 5 is a cross sectional view of a slightly modified form of my invention; and Fig. 6 is a longitudinal sectional view taken on approximately the line 6—6 of Fig. 5.

The wheel herein shown is adapted to be used on the rear axle of an automobile or other vehicle having an axle drive, but I wish it to be understood that my invention is not limited to a rear wheel or wheel that is adapted to be fixed or securely connected to a driven axle, for if desired the hub section of the wheel could be provided with a sprocket or other suitable means for coöperating with the driving member.

The hub section of the wheel shown in Figs. 1 and 2 is provided with a hub A that is fixed or securely connected to the axle 1 in any suitable manner and having a vertically disposed circular plate 2 that coöperates with a brake member 3 to form a pocket in which part of the rim section is telescoped or slidingly mounted. A circular flange 4 which projects laterally from one side of the plate 2 of the hub supports the cushion which will be hereinafter described, and said flange 4 is reinforced and strengthened by means of a number of radially disposed webs 5 connected to the hub A and to the plate 2 and also a number of short ribs 6 that project outwardly from the flange 4 and are connected to the plate 2, as shown in Fig. 2.

The brake member 3 is connected to the hub by means of bolts 7 or other suitable fastening devices which pass through said member and through the plate 2, and said plate and brake member are held spaced away from each other by means of a boss 8 formed on said plate adjacent the point where it is connected to the hub A. The brake member 3 is provided with a drum 3ª that coöperates with a brake (not shown), and said member is also provided adjacent its outer edge with a flange 9, radially disposed ribs 10 being arranged between said flange 9 and drum 3ª on the outer face of the brake member so as to reinforce and strengthen said member.

While I prefer to form the hub section of the wheel in the manner above described, I do not wish it to be understood that my broad idea is limited to this construction, for the hub member could be formed in various other ways without departing from the spirit of my invention.

The rim section of the wheel comprises a ring-shaped member 11, a felly 12, spokes 13 arranged between said member and felly, an approximately channel-shaped rim 14 connected to the felly and having a tread 15 arranged therein, and a plate 16 projecting inwardly from one edge of the member 11 and telescoped between the plate 2 and the brake member 3 of the hub section. The plate 16 is preferably provided with a laterally projecting flange 17 arranged inside of the ring-shaped member 11 and securely connected thereto, and if said ring-shaped member is formed of wood, as herein shown, metallic protecting rings 18 will be arranged on either side of same and securely connected to the flange 17 so as to produce a strong and rigid structure.

A cushion C of any preferred type, preferably a pneumatic cushion, is connected to a rim 19 that is loosely mounted on the circular flange 4 of the hub section, the outer casing of said cushion being provided on its longitudinal edges with beads $c'$ that coöperate with a curved lip $19'$ on the rim 19 and a curved lip on a clamping ring 20 that is detachably connected to the rim 19 by means of fastening devices 21.

A number of rollers 22, or other suitable friction-reducing devices, are arranged between the cushion C and the rim section of the wheel, and said rollers are connected in such a manner that they can travel around the cushion or shift relatively thereto, the means herein shown for connecting the rollers consisting of a pair of hoops 23 in which trunnions on the rollers are journaled, said hoops being connected together by tie bars 24 so as to prevent the rollers from twisting or assuming any other than an absolutely transverse position with reference to the rim section and cushion on which they bear.

Rotary movement is transmitted from one section to the other by means of one or more links 25 which are connected to the hub section and rim section, the wheel herein shown having a single link that is provided at one end with a trunnion 26 which projects into an opening in the plate 16 of the rim section, and at its other end with a trunnion 27 which coöperates with a buffer carried by the hub section. I have herein shown a buffer which consists of a piece of rubber 28 arranged in a pocket 29 on the brake member 3 of the hub section and provided with an opening which receives the trunnion 27 on said link, the inner wall of the pocket 29 through which said trunnion projects having an elongated slot 30 formed therein so as to provide for the movements of said trunnion relatively to said pocket. The buffer 28 absorbs the shocks to which one section of the wheel is subjected when the other section is started or stopped suddenly or subjected to a twisting strain, and it thus reduces the liability of breaking the connecting means between the hub and rim sections when the hub section is stopped or started quickly. Various other kinds of buffers could be used instead of the rubber buffer herein shown, and the pocket in which said buffer is arranged could be formed in various ways, the pocket shown in Figs. 3 and 4 being formed by a portion of the brake member 3, two of the radially disposed ribs 10 on said brake member, and a plate 31 that is detachably connected to said ribs and to the flange 9 on the brake member.

A removable cap or cover plate 32, which is detachably connected to one of the metallic protecting rings 18 of the rim section, forms the outer face of the wheel, and a clamping ring 33, which is detachably connected to the circular flange 4 on the hub A, retains the rim 19 of the cushion C in operative position, said clamping ring being connected to said flange by bolts 34 or other suitable devices.

The inflating tube 35 of the cushion C lies in a transverse groove in the rim 19 and projects inwardly from one edge of said rim toward the center of the wheel, as shown in Figs. 1 and 2, and said tube is provided with a gage 36 that indicates the pressure of the air in the cushion, and also a valve 37 with which a compressed air supply pipe may be connected. The gage 36 and valve 37 of the inflating tube are located adjacent the center of the wheel, and in order that the compressed air supply pipe may be connected to the inflating tube without removing the side plate 32 of the rim section I have provided said side plate with a removable cap 38 which preferably contains a piece of glass 39 or other transparent material through which the air gage can be seen when the cap is arranged in operative position.

A split packing ring 40, which extends around the flange 9 on the brake member of the hub section, bears against the outer face of the plate 16 of the rim section and thus prevents water, dirt or other foreign matter from working through the joint between said parts and entering the chamber in which the cushion is arranged, said ring being provided with a covering of rubber or fibrous material.

Any suitable means may be employed for retaining the packing ring in position and forcing it tightly against the plate 16 and the flange 9 on which it is mounted, the means herein shown for retaining said packing ring in position consisting of resilient clamping devices 41 formed from pieces of spring wire and connected to the flange 9, as shown in Fig. 3.

In Figs. 5 and 6 I have illustrated a wheel of practically the same construction as the one shown in Figs. 1 and 2 except that roller bearings 42 of any preferred design are arranged between the rim 19 of the cushion and the circular flange 4 on the plate 2 of the hub section, said rollers being mounted in a cage which consists of two hoops 43 connected together by tie bars 44, as shown in dotted lines in Fig. 6.

The chief advantage of a wheel such as above described over other wheels of this type is that the cushion C is not subjected to excessive wear or strains as it is mounted in such a manner that it can turn or move circumferentially relatively to the hub section and rim section. If the cushion were permanently connected to the hub section it would be subjected to a great deal of friction when the hub section stopped or started suddenly or moved circumferentially relatively to the rim section, but by loosely mounting the cushion on the circular flange 4 of the hub section I eliminate this objectionable feature, a sudden starting or stopping of the hub section, or an uneven twisting strain on the hub and rim sections, having no effect on the cushion. Another desirable feature of my improved wheel is that a punctured cushion can be removed quickly and an inflated cushion substituted therefor after the outside cover plate 32 of the rim section and the clamping ring 33 on the hub section have been taken off, owing to the fact that the cushion is mounted on the removable rim 19 and the rollers with which the cushion coöperates are carried by cages which can be slipped bodily out of the annular-shaped chamber formed by the flange 4 of the hub section and the flange 17 on the plate 16 of the rim section. And still another advantage of such a construction is that a sectional ring-shaped filler can be arranged in position between the flanges 4 and 17 of the hub and rim sections, respectively, in case the cushion breaks or becomes punctured when the wheel is in service, thereby converting the wheel into a rigid wheel which will successfully carry the vehicle to its destination. There is very little danger of the cushion breaking, however, because it is arranged in a dust- and water-proof chamber which is filled with a lubricating medium which keeps the rollers thoroughly lubricated and reduces the friction on the cushion.

The wheel is strong and comprises comparatively few parts, and as it is not much wider than an ordinary automobile wheel it is not as cumbersome as other wheels of this type.

Having thus described the invention, what is claimed as new and desired to be secured by Letters Patent is:

1. A resilient wheel comprising a hub section and a rim section that can move relatively to each other in a vertical plane, a link pivotally connected to said sections for transmitting rotary movement from one of said sections to the other, a rotatable rim arranged between said sections that is adapted to turn or move circumferentially relatively thereto, a cushion carried by said rim, friction-reducing devices that bear directly upon said cushion and rim section and spaced away from each other, and a freely movable cage in which said friction-reducing devices are mounted.

2. A resilient wheel comprising a hub section and a rim section that can move relatively to each other in a vertical plane, a rim rotatably mounted on said hub section and provided with a cushion, spaced bearing devices arranged in engagement with said cushion and rim section and connected together in such a manner that they can shift or move relatively to the cushion, and a link pivotally connected to one section and yieldingly connected to the other section for transmitting rotary movement from one section to the other.

3. A resilient wheel comprising a hub section and a rim section that can move relatively to each other in a vertical plane, a rotatable rim loosely mounted on said hub section and provided with a cushion, spaced bearing devices arranged between said cushion and rim section in engagement with said cushion and connected together in such a manner that they can shift or move relatively to the cushion, a link pivotally connected to said sections for transmitting rotary movement from one section to the other, and yielding means for absorbing the shocks or strains to which one section is subjected when the other section is stopped or started suddenly.

4. A resilient wheel comprising a hub section, a rim section surrounding said hub section, a rim rotatably mounted on said hub section and provided with a cushion which is securely connected to the rim, coöperating means on said sections which form one side wall of a chamber in which the cushion is arranged, spaced bearing devices interposed between said cushion and the rim section, removable means for retaining said rim in operative position, and a removable cap plate on the rim section that forms the other side wall of the chamber in which said cushion is arranged.

5. A resilient wheel comprising a hub section, a rim section surrounding said hub section, telescoping parts on said sections which hold them in vertical alinement with each other and also form one side wall of a chamber, a plate detachably connected to the rim section and forming the other side wall of said chamber, said plate being adapted to be moved whenever it is desired to gain access to said chamber, a rotatable rim arranged in said chamber and adapted to turn or move circumferentially relatively to said sections, a cushion connected to said rim, and spaced bearing devices interposed between said cushion and the rim section and bearing directly upon the cushion.

6. A resilient wheel comprising a hub section provided with a pair of vertically disposed plates which are spaced away from each other, a circular flange securely connected to one of said plates, a rim section provided with a plate that telescopes between the plates on the hub section, a buffer carried by the plates on said hub section, a link connected to the plate on the rim section and coöperating with said buffer for transmitting rotary movement from one section to the other, a rim loosely mounted on the circular flange of the hub section and provided with a pneumatic cushion, an inflating tube projecting from one edge of said rim, and freely movable spaced bearing devices arranged between said cushion and the rim section.

7. A wheel comprising a hub section that consists of a hub having a vertically disposed plate, a circular flange projecting laterally from one side of said plate, and a member that coöperates with said plate to form a pocket, a rim section comprising a ring-shaped member surrounding said flange and spaced away therefrom and provided at one edge with an inwardly projecting plate which slides in the pocket of the hub section, a removable rim mounted on the circular flange of the hub section and provided with a cushion, means on said flange for retaining said rim in position, rollers interposed between said cushion and the ring-shaped member of the rim section, a cage which carries said rollers, and a removable face plate on said rim section that hides said cushion and hub section from view.

In testimony whereof I hereunto affix my signature in the presence of two witnesses, this tenth day of September 1910.

NICHOLAS SCHENK.

Witnesses:
 WELLS L. CHURCH,
 GEORGE BAKEWELL.

---

Copies of this patent may be obtained for five cents each, by addressing the "Commissioner of Patents, Washington, D. C."